May 17, 1966 A. SHOMER 3,251,952

ELECTRO-ACOUSTIC TRANSDUCER

Filed Dec. 22, 1961 2 Sheets-Sheet 1

AVRAHAM SHOMER
*INVENTOR.*

BY Karl F. Ross
AGENT

AVRAHAM SHOMER
*INVENTOR.*

BY
Karl F. Ross
AGENT 3,251,952
ELECTRO-ACOUSTIC TRANSDUCER
Avraham Shomer, Rav Amiel 29, Tel Aviv, Israel
Filed Dec. 22, 1961, Ser. No. 161,652
3 Claims. (Cl. 179—100.3)

My present invention relates to an apparatus for electrically recording and reproducing sound waves and other oscillations of relatively low frequency.

The development of microgroove technique has greatly increased the message content of conventional disks which are spirally scanned for recording and reproduction by means of an electromechanical transducer. The extent to which the density of the information content can be augmented by such means is, however, limited by physical considerations based upon the finite thickness of the recording or pickup needle or stylus to be employed.

It is, therefore, an object of my invention to provide an improved electro-acoustic transducer in which these limitations are obviated by virtue of the elimination of all mechanical translating elements.

Another object of this invention is to provide a transducer of this type which can be scanned in other ways than by the conventional spiral path.

A further object of the instant invention is to provide a sound record for phonograph-type reproducers which is capable of more convenient handling, storage and duplication than are the recording disks hitherto used.

The foregoing objects are realized, in accordance with my present invention, by the provision of a transducer including a photoelectric scanner, i.e. an electrically modulated beam source for recording or a beam-receiving photocell for reproduction, in combination with an optical system for magnifying a portion of a recording medium aligned with the scanner, there being further provided masking means interposed between the optical system and the scanner for restricting the scanned area of the recording medium to a spot of very reduced size, preferably with a linear dimension in the microscopic range extending between an upper limit of about one third of a millimeter (this being the width of conventional microgroove tracks) and a lower limit which is imposed by the grain separation of the recording medium and may be of the order of one hundredth of a millimeter. Various means known per se may be used for relatively displacing the recording medium and the transducer during scanning.

The scanning displacement between the transducer and the recording medium may be brought about by any conventional mechanism for producing relative motion between these elements; a manual adjustment of the masking means is, advantageously, also possible in order to facilitate the start of the scanning operation (especially for purposes of reproduction) at a particular location of the track-carrying medium. Moreover, pursuant to a more specific feature of the invention, means may be provided for starting the scanning operation automatically when the scanner is accurately aligned with the track, preferably under the control of an auxiliary scanning circuit which ascertains the passage of a starting section of predetermined character (e.g. of a certain minimum luminous intensity) to initiate coordinated motion between the scanner and the record carrier; thus, the scanner may be first set to sweep the starting section of the track at a small angle thereto, e.g. the angle of deviation of a spiral track from a circular path, and may proceed to follow the track upon detecting the portion of characteristic luminosity thereof. The starting section of the track may, for this purpose, consist of an alternation of bright and dark turns or passes whose slow interchange as seen by the scanner produces a pulse constituting the clutching-in signal for the scanning drive.

The invention will be described in greater detail with reference to the accompanying drawing in which.

Figure 1:
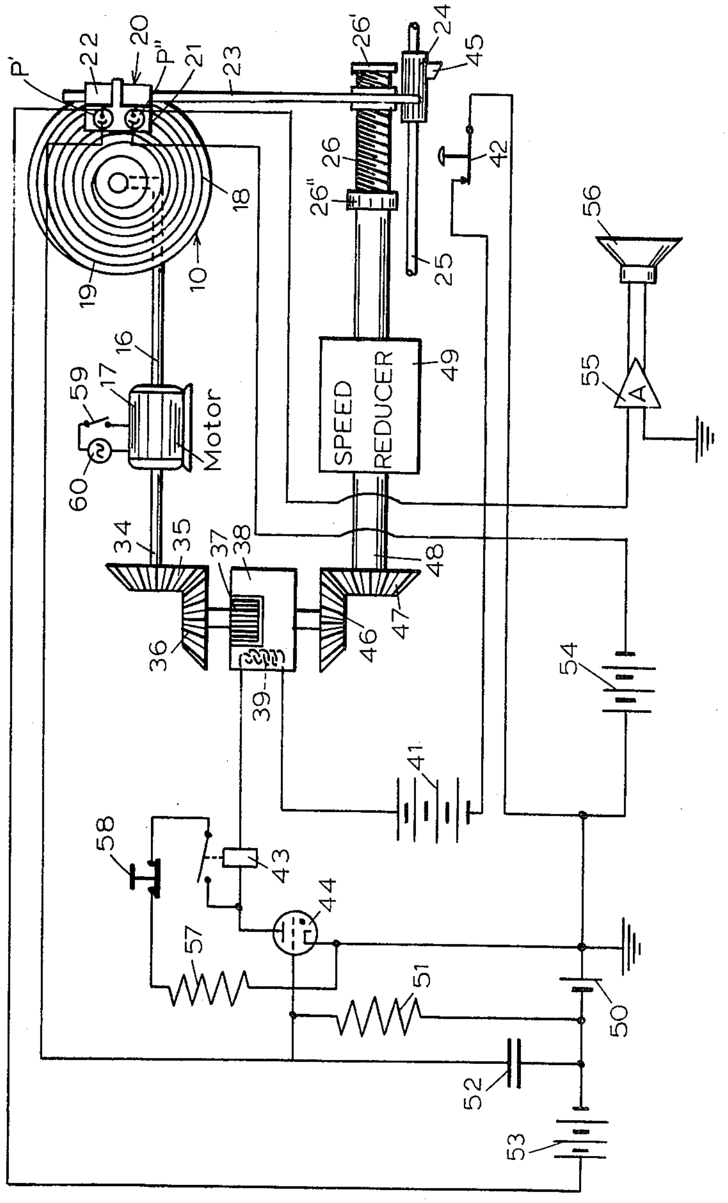
FIG. 1 is an overall diagrammatic view of a system embodying the invention.
Figures 2, 3, 4:
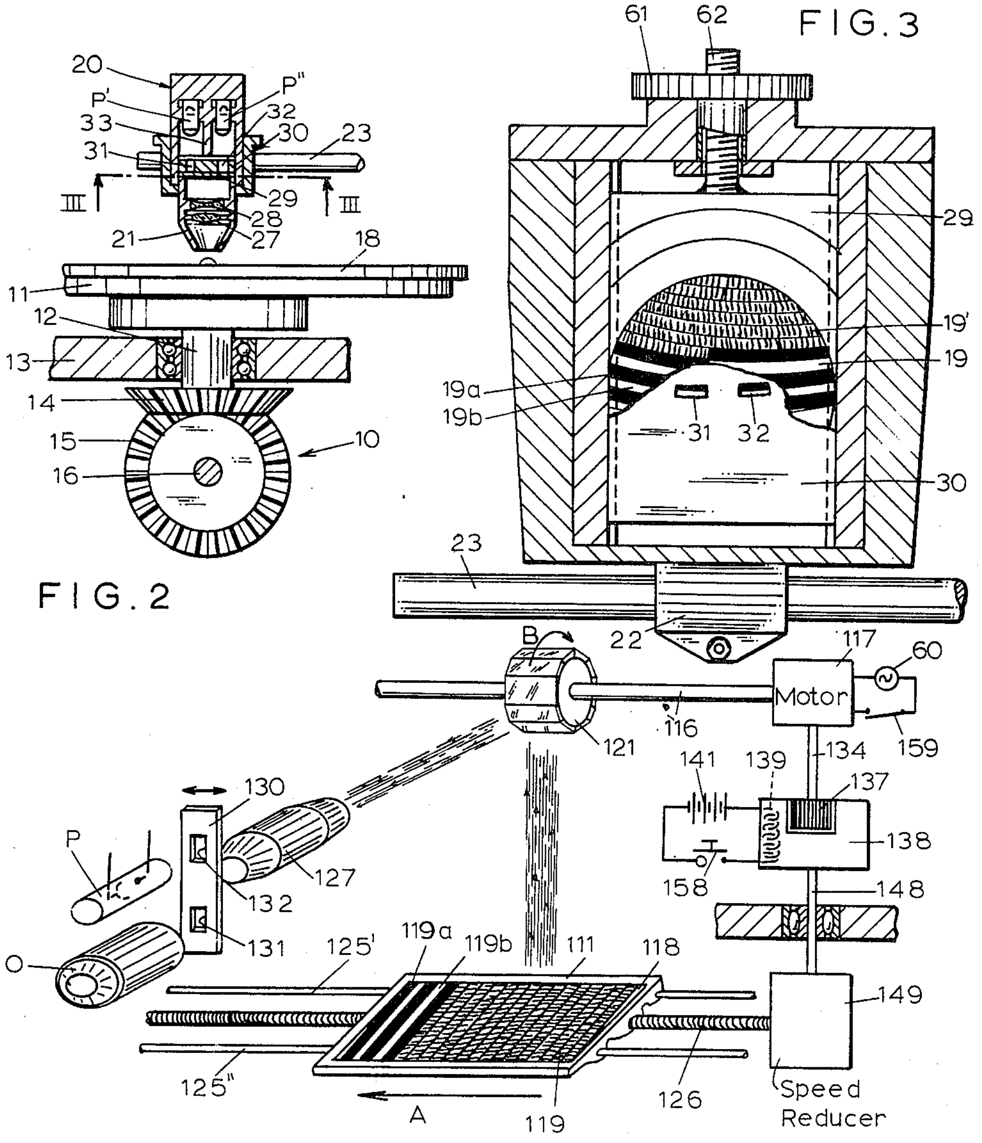
FIG. 2 is a detail view (parts broken away) of a scanner forming part of the system of FIG. 1.
FIG. 3 is an enlarged sectional view taken substantially on line III—III of FIG. 2.
FIG. 4 diagrammatically illustrates another embodiment of the invention.

In FIGS. 1 to 3 I have shown a system comprising a message carrier 10 (FIG. 2) in the form of a platter 11 whose shaft 12 is rotatably secured in a fixed support 13. A bevel gear 14 on shaft 12 mates with a similar gear 15 on a shaft 16 which is driven by a motor 17. The platter 11 carries a disk-shaped recording medium 18 on which the message appears as a continuus spiral strip 19 of varying brightness. The turns of strip 19 are considerably exaggerated in width on the drawing.

A scanner 20 comprising, essentially, an objective housing 21 is supported by a clamping connection 22 on a carriage here represented by a cantilevered arm 23 which at its other end terminates in a block 24; the latter has a cylindrical bore traversed by a guide rode 25 and a threaded bore accommodating a lead screw 26. Housing 21 contains a magnifying objective, here shown as composed of lenses 27, 28, a ground-glass plate 29 positioned in the image plane of that objective, and a masking plate 30 overlying the ground-glass plate 29. Plate 30 has two openings 31, 32, separated by a partition 33, lying in a zone upon which a single magnified turn of the projected image 19' of strip 19 (FIG. 3) is located. The openings 31, 32 are respectively aligned with a pair of photocells P', P'' in housing 21. As will be seen from FIG. 3, the dimension of the openings 31, 32 transverse to the track is substantially equal to the magnified width of the turns or passes of the track 19.

Motor 17 has a second shaft 34 coupled, via bevel gears 35, 36 with a fluted cylindrical ferromagnetic body 37 forming part of a magnetic clutch which also includes a conventional ferromagnetic rotor 38 with the usual field coils 39 (only one shown) surrounding that body. A control circuit for clutch 37–39 includes a source of electric current, here shown as a battery 41, connected in series with a circuit breaker 42, the winding of a relay 43 and a thyratron 44 across the coil 39. Circuit breaker 42 is operable by a cam 45 on block 24 when the objective housing 21 has reached the end of its radial inward displacement on disk 18 under the control of screws 26. The latter is driven from rotor 38 via bevel gears 46, 47, a shaft 48 and a speed reducer 49. A small biasing battery 50 maintains the cathode of tube 44 positive with respect to its grid which is returned to the negative terminal of that battery through a resistor 51 shunted by a smoothing condenser 52.

Photocell P' is energized by another battery 53 connected in series with it across resistor 51 and condenser 52. Photocell P'' is connected in series with a further battery 54 across the input of a signal amplifier 55 whose output is delivered to an electro-acoustic transducer such as a loudspeaker 56. A holding circuit for relay 43 extends from the cathode of tube 44 through a resistor 57, a manual circuit breaker 58, and an armature and front contact of that relay to the plate of the tube. A switch 59 serves to connect motor 17 across its energy source 60.

Block 24 is designed as an openable lock nut so as to be releasable from screw 26 whenever it is desired to restore the system to a starting position in which the objective 27, 28 is trained upon the outer rim of the message area of disk 18 occupied by the strip 19. Further adjustment is possible by manual rotation of the screw 26. Final adjustment of the position of apertured plate 30 relative to the projected image 19' can be effected with the aid of a threaded knob 61 engaging a bolt 62 which projects outwardly from that plate.

In operation, the user retracts the carriage 23, 24 with objective housing 21 until the block 24 strikes an abutment 26' of feed screw 26; the other limiting position of the carriage is defined by a similar abutment 26''. With block 24 next to stop 26', the field of view of objective 27, 28 is substantially centered on the rim of disk 18 where the strip 19, as best seen in FIG. 3, forms several alternately dark and light turns having images **19*a*, 19*b*. With switch 59 closed to rotate the platter 11, and with relay 43 unoperated, disk 18 spins while the arm 23 with housing 21 remains stationary. The openings 31, 32 in masking plate 30 are thus successively swept by the images 19*a*, 19*b* of adjacent turns whereby the resistance of each photocell is caused to fluctuate in a generally sinusoidal manner. Thus, when one of the light turns 19*b* is aligned with aperture 31, photocell P' attains its highest conductivity whereby the grid of thyratron 44 is driven sufficiently positive to ionize that tube; the presence of condenser 52** prevents such ionization from occurring in response to an occasional bright spot on one of the subsequent turns which contain the message to be reproduced.

When tube 44 fires, relay 43 is energized and attracts its armature to lock independently of the thyratron. Since coil 39 is in series with the winding of the relay, it simultaneously actuates the magnetic clutch 37, 38 whereby screw 26 is driven and housing 21 advances radially inward. Thus, photocell P' as well as photocell P'' remains aligned with the track since the strip image continues to register with the apertures 31, 32. The signal picked up by photocell P'' is communicated via amplifier 55 to loudspeaker 56 for audible reproduction.

When the block 24 approaches stop 26'', its cam 45 actuates circuit breaker 42 to deactivate the relay 43 and the clutch 37, 38; the carriage 23, 24 now comes to a halt, though the disk 18 continues to spin until the motor 17 is de-energized.

If because of improper preliminary alignment the magnetic clutch should fail to become effective at the beginning of operations, the situation may be corrected by manually readjusting the plate 30 with the aid of knob 61. Such readjustment may also be monitored visually upon a removal of the upper part of housing 21 carrying the photocells P' and P''.

In the modified system of FIG. 4, in which similar or analogous elements have been designated by the same reference numerals as in FIGS. 1–3 with the addition of a "1" in the hundreds position, the scanner comprises a multifaceted mirror 121 on a shaft 116 which is driven by a motor 117. The record carrier is here a rectangular plate 111 on which the recording medium 118 is supported; this medium is a sheet 118 whose information content forms a track 119 composed of a succession of generally transverse passes slightly inclined to the minor sides of the rectangle. The passes of track 119 are produced in known manner by repeated sweeps of a beam of light across the photosensitive sheet 118 (or an original from which the same is subsequently copied) while the sheet is longitudinally displaced as indicated by arrow A. Carrier plate 111 is guided by two rods 125', 125'' and advanced by a lead screw 126 which is driven, in proper synchronism with the rotation (arrow B) of multiple reflector 121, from motor 117 via a shaft 134, a magnetic clutch 137, 138, a further shaft 148 and a speed reducer 149. Thus, the composite motion indicated by arrows A and B gives rise to a scan which sweeps successively across the several passes of track 119 whose width, like that of the turns of track 19 in the preceding figures, may range between about 0.01 and 0.1 mm. The scanning rays are focused by the stationary magnifying objective 127 which, within a housing not shown, directs selected portions of the magnified track image with or without the interposition of a ground-glass plate (as in the preceding embodiment) through apertures 131, 132 of a masking plate or diaphragm 130. Aperture 131 has been shown aligned with an eyepiece O whereas aperture 132 registers with a photocell P whose function is identical with that of cell P'' of FIGS. 1 and 2. A manual switch 158 serves for the selective energization of clutch coil 139 from a source 141 after motor 117 has been set into operation by closure of a switch 159 in series with its power supply 160.

The operation of the system of FIG. 4 is generally similar to that of the preceding embodiment, except that the clutching-in is here controlled manually by the operator upon observation, through eyepiece O, of a bright pass **119*b* between dark passes 119*a* in alignment with the viewing aperture 131**.

Both the disk 18 and the record 118 may be flexible sheets of paper or the like which can be conveniently stored in, for example, rolled-up condition and are easily reproduceable from a master copy by typographic or photographic techniques. The sheets may be opaque or transparent for scanning by either reflection or translumination.

The systems shown and described may, with substitution of recording equipment for the reproducers illustrated (e.g. replacement of photocell P by a modulated electric light source), be utilized for making the sound tracks 19, 119 as will be readily understood by persons skilled in the art. Naturally, the automatic alignment means provided in the device of FIGS. 1–3 could also be utilized in the modification of FIG. 4, and various other modifications of the arrangement herein disclosed are possible without departing from the spirit and scope of the invention as defined in the appended claims.

I claim:

1. An apparatus for reproducing recorded messages, comprising a support for an optically scannable recording medium, optical scanning means adjacent said support, mechanism for relatively displacing said support and said scanning means for tracing on said support a track composed of a multiplicity of closely spaced passes, photoelectric pickup means coupled with said scanning means for translating changes in the luminosity of a scanned track portion into an electric variable, optical magnifying means positioned between said support and said scanning means for juxtaposing the latter with an enlarged image of said passes, and masking means interposed between said magnifying means and said scanning means for reducing the effective field of view of the latter to an area substantially corresponding at least in transverse dimension to the width of the enlarged image of any of said passes, said mechanism comprising first and second drive means for respectively imparting a first and a second component of relative displacement to said support and said scanning means, manual contact means for initially operating only said first drive means whereby the enlarged images of different passes of said track move successively through said field of view, start means controlled by said scanning means for producing a signal upon the scanning of a track portion of distinctive luminosity in the operated condition of said first drive means, and coupling means responsive to said signal for operating said second drive means in synchronism with said first drive means upon alignment of said field of view with one of said passes.

2. An apparatus for reproducing recorded messages, comprising a rotatable support for an optically scannable recording medium, optical scanning means adjacent said support, mechanism for relatively displacing said support and said scanning means for tracing on said support a spiral track composed of a multiplicity of closely spaced turns, photoelectric pickup means coupled with said scanning means for translating changes in the luminosity of a scanned track portion into an electric variable, optical magnifying means positioned between said support and said scanning means for juxtaposing the latter with an enlarged image of said turns, masking means interposed between said magnifying means and said scanning means for reducing the effective field of view of the latter to an area substantially corresponding at least in transverse dimension of the track to the width of the enlarged image of any of said turns, said mechanism comprising first drive means for rotating said supporting and second drive means for radially shifting said scanning means with reference to the axis of rotation of said support, manual control means for initially operating only said first drive means whereby the enlarged images of different turns of said track move successively through said field of view, start means controlled by said scanning means for producing a signal upon the scanning of a track portion of distinctive luminosity in the operated condition of said first drive means, and coupling means responsive to said signal for operating said second drive means in synchronism with said first drive means upon alignment of said field of view with one of said turns.

3. An apparatus as defined in claim 2 wherein said scanning means includes a first photoelectric cell connected to said pickup means and a second photoelectric cell connected to said start means.

References Cited by the Examiner

UNITED STATES PATENTS

| | | | |
|---|---|---|---|
| 2,169,405 | 8/1939 | Cooney | 179—100.3 X |
| 2,384,131 | 9/1945 | Price | 179—100.3 |
| 2,422,398 | 6/1947 | Dilks | 179—100.3 X |
| 2,508,451 | 5/1950 | Dicke | 179—100.3 |
| 2,654,810 | 10/1953 | Miessner | 179—100.3 |
| 2,851,539 | 9/1958 | Brown | 179—100.3 |
| 2,932,781 | 2/1960 | Gordon | 179—100.3 |
| 3,046,836 | 7/1962 | Schwartz et al. | 179—100.3 X |

FOREIGN PATENTS

| | | |
|---|---|---|
| 566,112 | 12/1944 | Great Britain. |

IRVING L. SRAGOW, *Primary Examiner.*

BERNARD KONICK, *Examiner.*